United States Patent
Sato

[11] Patent Number: 5,907,731
[45] Date of Patent: May 25, 1999

[54] DARK CURRENT SENSING DEVICE AND RECORDING OPERATION CONTROL DEVICE

[75] Inventor: Koichi Sato, Tokyo, Japan

[73] Assignees: Asahi Kogaku Kogyo Kabushiki Kaisha; Dai Nippon Printing Co., Ltd., both of Tokyo, Japan

[21] Appl. No.: 08/803,151

[22] Filed: Feb. 19, 1997

[30] Foreign Application Priority Data

Feb. 22, 1996 [JP] Japan .................................. 8-060134
Jul. 19, 1996 [JP] Japan .................................. 8-209167

[51] Int. Cl.$^6$ ................................................ G03B 19/00
[52] U.S. Cl. ........................................ 396/429; 349/116
[58] Field of Search ....................... 396/30, 429; 349/24, 349/25, 33, 34, 38, 116

[56] References Cited

U.S. PATENT DOCUMENTS

| | | | |
|---|---|---|---|
| 3,957,349 | 5/1976 | Nelson | 350/160 |
| 4,670,369 | 6/1987 | Nakagawa et al. | 430/128 |
| 4,841,322 | 6/1989 | Kawasaki et al. | |
| 4,945,376 | 7/1990 | Kawasaki et al. | |
| 5,315,410 | 5/1994 | Takanshi et al. | |
| 5,408,341 | 4/1995 | Takanashi et al. | |
| 5,424,156 | 6/1995 | Aoki et al. | |
| 5,514,504 | 5/1996 | Iijima et al. | |
| 5,516,607 | 5/1996 | Iijima et al. | 430/20 |
| 5,793,453 | 8/1998 | Okabe | 349/86 |

FOREIGN PATENT DOCUMENTS

| | | |
|---|---|---|
| 0327236 | 8/1989 | European Pat. Off. . |
| 0622954 | 11/1994 | European Pat. Off. . |
| 2-29081 | 1/1990 | Japan . |
| 3-15087 | 1/1991 | Japan . |
| 3-278342 | 12/1991 | Japan . |
| 5-2280 | 1/1993 | Japan . |
| 5-24706 | 4/1993 | Japan . |
| 5-150251 | 6/1993 | Japan . |
| 5-165005 | 6/1993 | Japan . |
| 6-130347 | 5/1994 | Japan . |
| 6-313872 | 11/1994 | Japan . |
| 6-313894 | 11/1994 | Japan . |
| 7-13132 | 1/1995 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A dark current sensing device provided in an electro-developing type camera with an electro-developing recording medium, to sense a resistance of an electrostatic information recording medium provided in an electro-developing recording medium. A dark current sensing resistor is connected to the electrostatic information recording medium in series, and a capacitor is connected to the dark current sensing resistor in parallel. A voltage sensing unit is connected to the dark current sensing resistor and the capacitor in parallel to sense a voltage generated in the dark current sensing resistor. The product of the resistant value of the resistor and the capacity of the capacitor is approximately equal to the product of the resistant value and the capacity of the electrostatic information recording medium.

6 Claims, 8 Drawing Sheets

| DARK CURRENT Id | APPLIED VOLTAGE Vap | APPLICATION PERIOD Tap |
|---|---|---|
| $I_0 \sim I_1$ | $V_1$ | $t_1$ |
| $I_1 \sim I_2$ | $V_2$ | $t_2$ |
| $I_2 \sim I_3$ | $V_3$ | $t_3$ |
| $I_3 \sim I_4$ | $V_4$ | $t_4$ |
| $I_4 \sim I_5$ | $V_5$ | $t_5$ |
| $I_5 \sim I_6$ | $V_6$ | $t_6$ |
| $I_6 \sim I_7$ | $V_7$ | $t_7$ |

DARK CURRENT SENSING DEVICE AND RECORDING OPERATION CONTROL DEVICE

BACKGROUND OF THE INVENTION

1. Field of the Invention

The present invention relates to a camera using a recording medium in which an object image obtained through a photographing optical system is electronically developed, and more particularly, to a device for determining an electric voltage applied to the recording medium.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. In this specification, such a recording medium is referred to as an electro-developing recording medium, and an electronic still camera using the electro-developing recording medium is referred to as an electro-developing type camera.

Japanese Unexamined Patent Publication Nos. 5-165005, 6-130347 and 7-13132 disclose an electro-developing recording medium which comprises a liquid crystal display having a memory-type liquid crystal so that an image indicated on the liquid crystal display is kept, even if the electric field applied to the liquid crystal display is removed. '347 and '132 disclose an electro-developing recording medium in which the electrostatic information recording medium and the electric charge storage medium are combined to form one body. Namely, in these electro-developing recording mediums, even if an electric voltage applied thereto is removed, the image formed on the electro-developing recording medium is kept.

For recording a clear image on the electro-developing recording medium, the applied electric voltage and the voltage application period on the recording medium are important components (see Japanese Unexamined Patent Publication No. 6-313872). These components depend upon the characteristics, i.e., the resistances and the electrostatic capacities of an electric charge storage medium and an electrostatic information recording medium which are provided in the electro-developing recording medium. Especially, the resistance of the electrostatic information recording medium is greatly affected by the environment such as temperature around the electro-developing recording medium. Namely, by detecting the resistance before the recording operation, the applied electric voltage and the voltage application period on the electro-developing recording medium can be properly controlled.

For detecting the resistance of the electrostatic information recording medium, it is necessary that an electric voltage is applied thereto while the electrostatic information recording medium is shut from ambient daylight, and a dark current, i.e., an electric current flowing therein is sensed. However, since the electrostatic information recording medium has an electrostatic capacitance due to the structure thereof, and is equivalent to an electric circuit in which a resistor and a capacitance are connected in parallel, a relatively long time is needed before the electric condition of the electrostatic information recording medium becomes stable so that the dark current can be sensed.

SUMMARY OF THE INVENTION

Therefore, an object of the present invention is to provide a dark current sensing device by which the resistance of the electrostatic information recording medium can be detected within a short time, so that the recording operation of the electro-developing recording medium can be started as soon as the electro-developing recording medium is set in the camera, and to provide a recording operation control device including the dark current sensing device.

According to the present invention, there is provided a dark current sensing device mounted in an electro-developing type camera using an electro-developing recording medium in which a visible image corresponding to an image formed on an electrostatic information recording medium is electronically developed by an electric charge storage medium, the electrostatic information recording medium having a first time constant in an electric voltage change thereof, the dark current sensing device comprising a dark current sensing resistor, a capacitor, and an electric voltage sensing processor.

The dark current sensing resistor is connected in series to the electrostatic information recording medium. The dark current sensing resistor has a second time constant in an electric voltage change thereof. The capacitor is connected in parallel to the dark current sensing resistor. The electric voltage sensing processor senses an electric voltage generated in the dark current sensing resistor. The resistance value of the dark current sensing resistor and the capacity of the capacitor are determined in such a manner that the second time constant is substantially equal to the first time constant.

Further, according to the present invention, there is provided a recording operation control device provided in an electro-developing type camera using an electro-developing recording medium in which a visible image corresponding to an image formed on an electrostatic information recording medium is electronically developed by an electric charge storage medium, the electrostatic information recording medium having a first time constant in an electric voltage change thereof, the recording operation control device comprising a dark current sensing resistor, a capacitor, an electric voltage sensing processor, a dark current sensing processor, and a voltage control processor.

The dark current sensing resistor is connected in series to the electrostatic information recording medium. The dark current sensing resistor has a second time constant in an electric voltage change thereof. The capacitor is connected in parallel to the dark current sensing resistor. The electric voltage sensing processor senses an electric voltage generated in the dark current sensing resistor. The dark current sensing processor senses a dark current flowing in the electrostatic information recording medium, based on an electric voltage generated in the dark current sensing resistor. The voltage control processor controls the value of an electric voltage applied to the electro-developing recording medium when the visible image is electronically developed by the electric charge storage medium. The resistance value of the dark current sensing resistor and the capacity of the capacitor are determined in such a manner that the second time constant is substantially equal to the first time constant.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
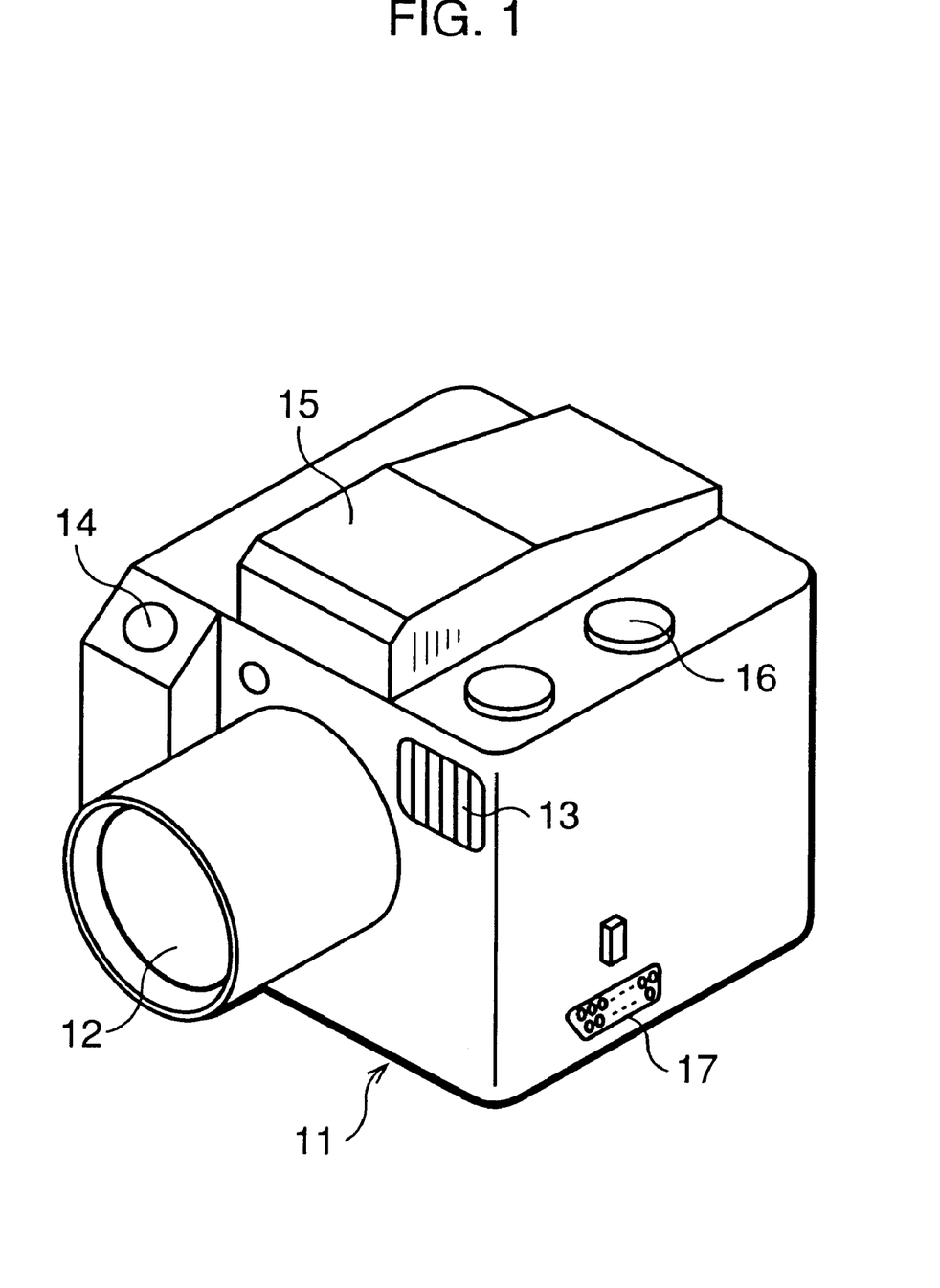
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view finder 15 is provided at the center portion thereof and is extended from the front to the rear end of the camera body 11. A mode select switch 16 is provided on the upper surface and beside the view finder 15. An output terminal 17 is provided on a lower portion of a side surface of the camera body 11, so that an image signal obtained by this camera can be outputted to an external recording device (not shown).

Figure 2:
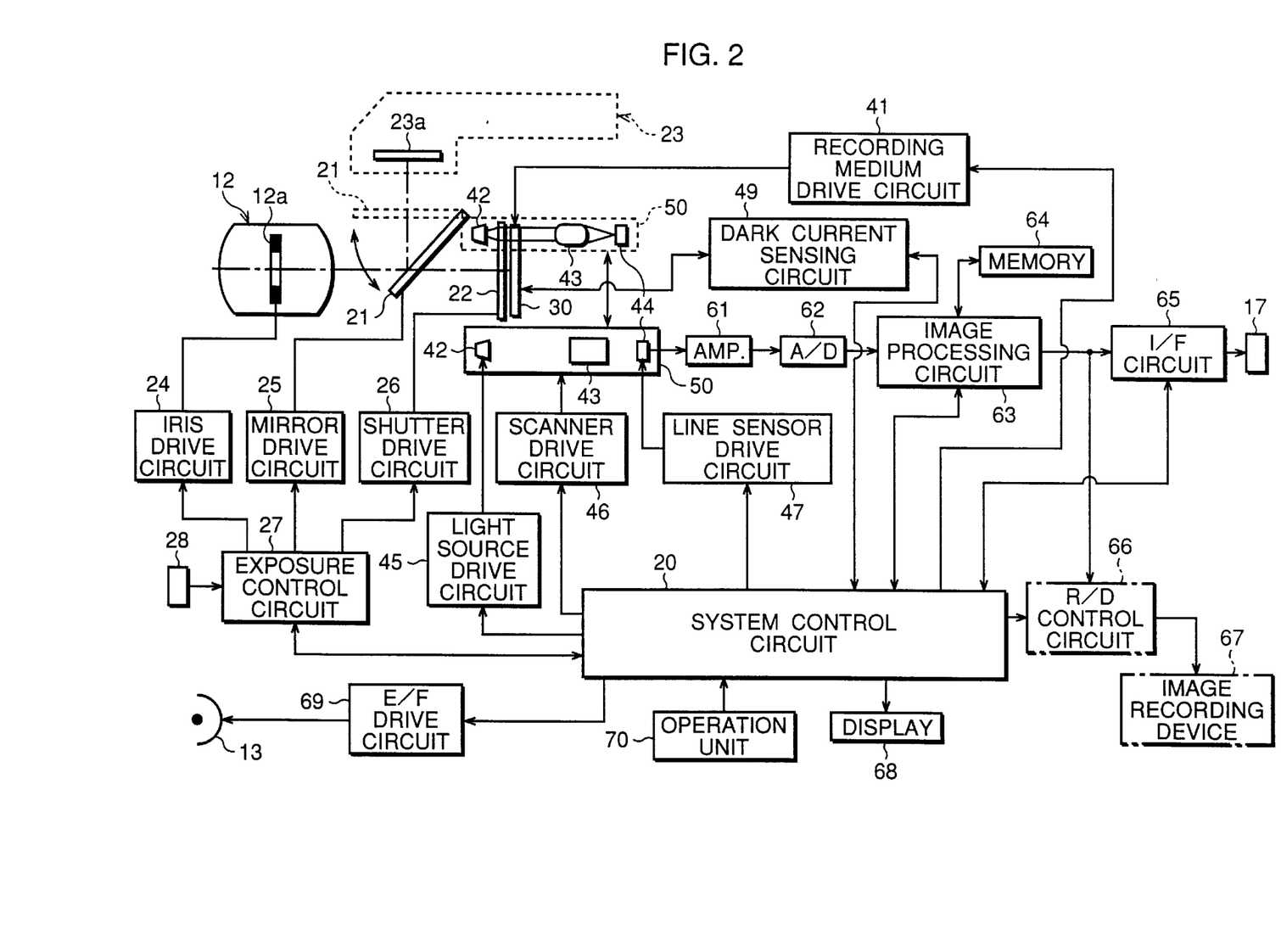
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42, a scanner optical system 43, and a line sensor 44 are supported by the scanning mechanism 50, and are moved along the electro-developing recording medium 30 by a scanning operation of the scanning mechanism 50.

The light source 42 has a plurality of LED (photodiodes), and can be moved along a front surface of the shutter 22 or the front surface of the electro-developing recording medium 30. The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The line sensor 44 can be moved along the rear surface of the electro-developing recording medium 30, together with the light source 42. The scanner optical system 43 is disposed between the light source 42 and the line sensor 44. When a scanning operation is carried out by the scanning mechanism 50, the scanner optical system 43 is positioned between the electro-developing recording medium 30 and the line sensor 44, so that the image developed by the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. Control of the movement of the scanning mechanism 50 is performed by a scanner drive circuit 46. The circuits 45, 46, and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process, such as a format conversion, and can then be outputted to an external computer (not shown) through the output terminal 17. The pixel signals outputted from the image process circuit 63 are subjected to a predetermined process such as an image compression and a format conversion in a recording device control circuit 66, so that the pixel signals can be recorded on a recording medium such as an IC memory card, for example, in an image recording device 67. The interface circuit 65 and the recording device control circuit 66 are operated in accordance with a command signal outputted from the system control circuit 20.

An operation unit 70 including the release switch 14 and the mode select switch 16 is connected to the system control circuit 20. A photography operation (i.e., a recording operation) and a reading operation are performed by operating the release switch 14 and the mode select switch 16. A display device 68 is connected to the system control circuit 20 to indicate various setting conditions of the electro-developing type camera. Further, an electric flash drive circuit 69 is connected to the system control circuit 20 to control the flash operation of the electronic flash 13.

When a reading of an image from the electro-developing recording medium 30 is not performed, the scanning mechanism 50 is in a position offset from a path between the photographing optical system 12 and the electro-developing recording medium 30; this position being below the electro-developing recording medium 30, for example. When an image recorded on the electro-developing recording medium 30 is read, a scan drive motor included in the scanner drive circuit 46 is rotated, and thus the scanning mechanism 50 is moved upward so that a scan of the line sensor 44 is carried out, and the line sensor 44 is moved in a direction perpendicular to the longitudinal direction of the line sensor 44.

A dark current sensing circuit 49 is provided for determining the applied electric voltage and the voltage application period on the electro-developing recording medium 30 in a recording operation. Namely, when the recording operation is started, a dark current generated in the electro-developing recording medium 20 is detected by the dark current sensing circuit 49 while the shutter 22 is closed, the resistant value of the electro-developing recording medium 30 is sensed based on the dark current. Based on the resistant value, the optimum applied voltage and the optimum application period for recording an image on the electro-developing recording medium 30 are determined. Determination of the applied voltage and the voltage application period is carried out under the control of the system control circuit 20.

Figure 3:
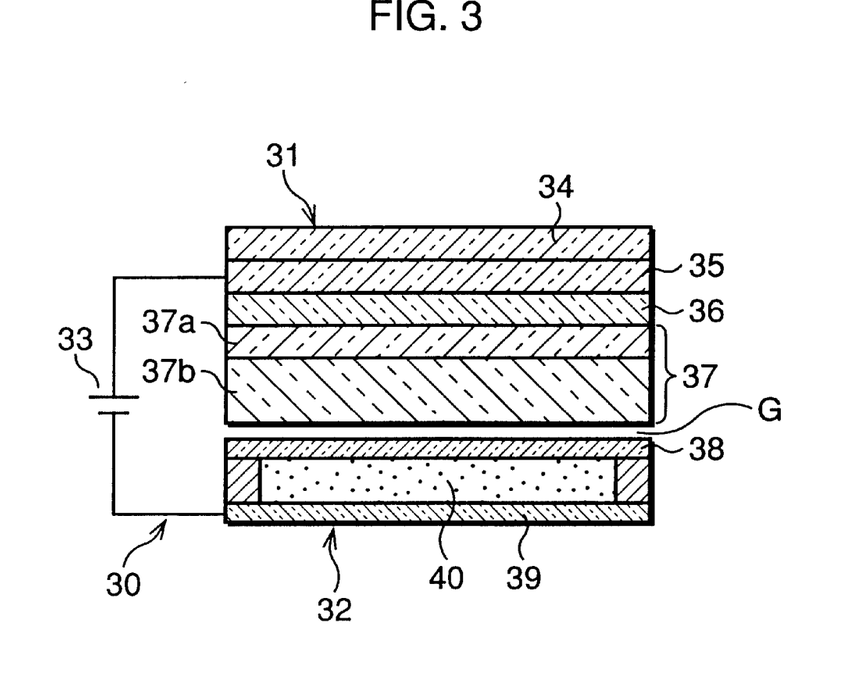
FIG. 3 is a sectional view showing a first example of a structure of an electro-developing recording medium.

FIG. 3 shows a first example of a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap G therebetween.

An ON-OFF condition of the electric power source 33 is controlled by the recording medium drive circuit 41 (see FIG. 2). When the electric power source 33 is turned on, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge storage medium 32 can be used repeatedly.

Figure 4:
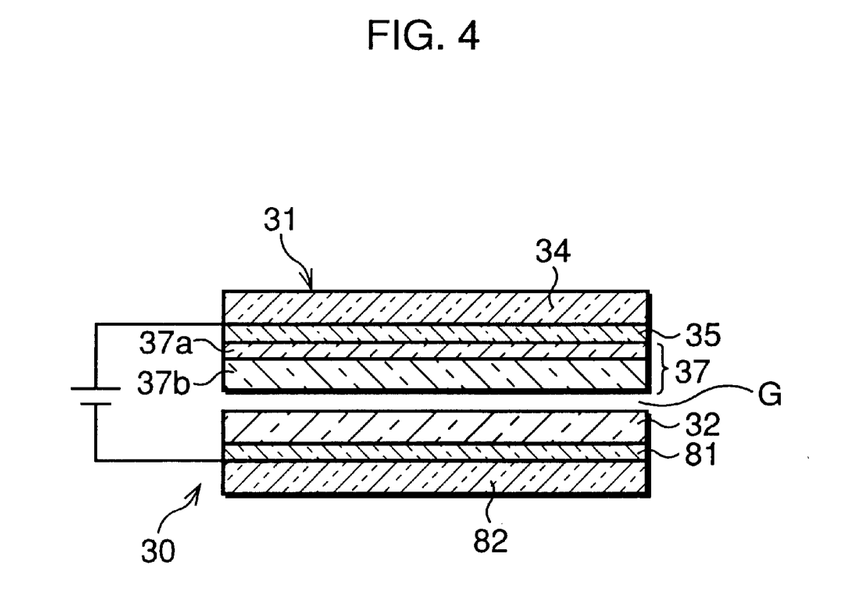
FIG. 4 is a sectional view showing a second example of a structure of the electro-developing recording medium.

FIG. 4 shows a second example of a structure of the electro-developing recording medium 30, and is the same as that shown in Japanese Unexamined Patent Publication No. 5-165005.

The electrostatic information recording medium 31 is formed by laminating the base plate 34, the electrode layer 35 and the photoconducting layer 37. The photoconducting layer 37 is formed by laminating the electric charge generating layer 37a and the electric charge transferring layer 37b. The electric charge storage medium 32 is a liquid crystal display having a memory-type liquid crystal such as a smectic liquid crystal, and faces the photoconducting layer 37 with a small gap G therebetween. An electrode layer 81 and a base plate 82 are laminated on a surface of the electric charge storage medium 32, which surface is opposite to the electrostatic information recording medium 31. The other structures are the same as those shown in FIG. 3.

Figure 5:
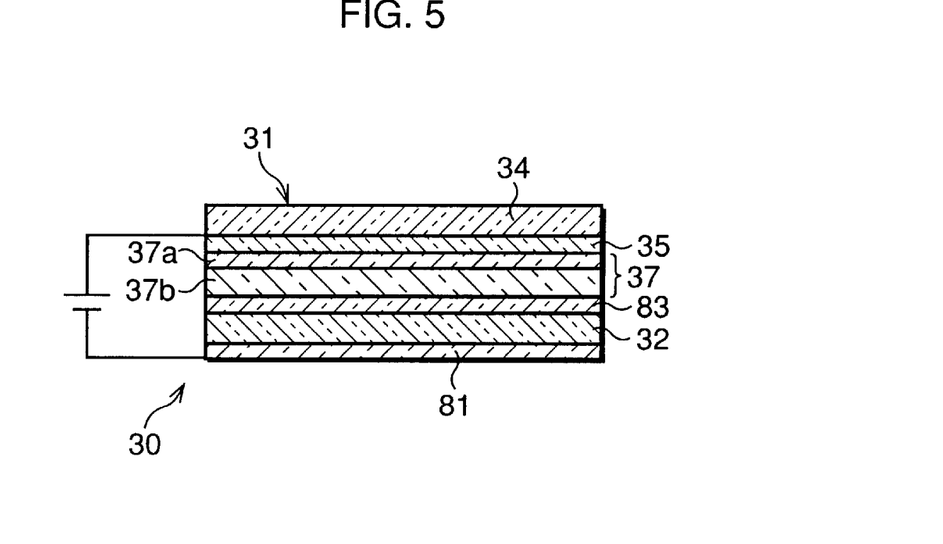
FIG. 5 is a sectional view showing a third example of a structure of the electro-developing recording medium.

FIG. 5 shows a third example of a structure of the electro-developing recording medium 30, and is the same as that shown in Japanese Unexamined Patent Publication Nos. 6-130347 and 7-13132.

This electro-developing recording medium 30 is of a uni-body type. In the electro-developing recording medium 30, an insulating layer 83 is provided between the electric charge transferring layer 37b of the electrostatic information recording medium 31 and the electric charge storage medium 32 which is a liquid crystal display having a memory-type liquid crystal such as a smectic liquid crystal, and an electrode layer 81 is laminated on a surface of the electric charge storage medium 32 which surface is opposite to the electrostatic information recording medium 31. The other structures are the same as those shown in FIG. 4. Namely, no gap is formed between the electrostatic information recording medium 31 and the electric charge storage medium 32.

The electro-developing recording mediums 30 shown in FIGS. 3 through 5 can be used in the still video camera having an electric circuit shown in FIG. 1. The following description assumes that the still video camera is provided with the electro-developing recording medium 30 shown in FIG. 3.

Figure 6:
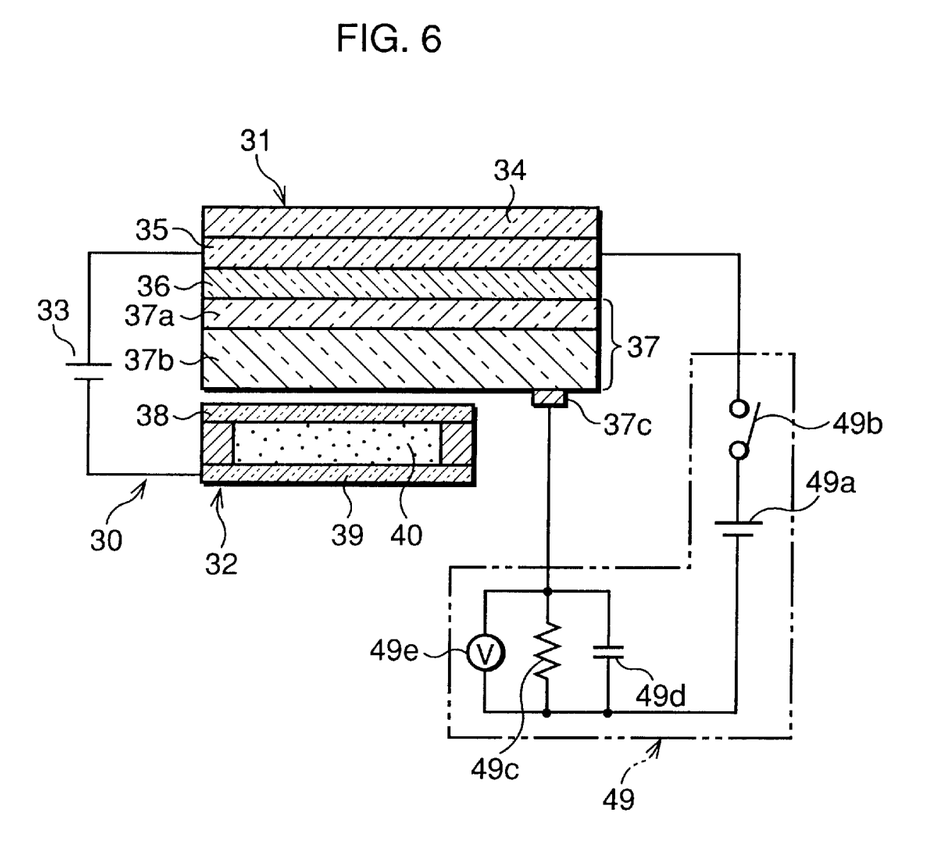
FIG. 6 is a diagram showing a relationship between the electro-developing recording medium and a dark current sensing circuit.

FIG. 6 is a diagram showing a circuit in which the dark current sensing circuit 49 is connected to the electro-developing recording medium 30 shown in FIG. 3.

The dark current sensing circuit 49 has a power source 49a, a switch 49b, a dark current sensing resistor 49c, a capacitor 49d, and a voltage detecting unit 49e. The switch 49b is connected between the electrode layer 35 and the positive electrode of the power source 49a in series. One end of the dark current sensing resistor 49c is connected to an electrode 37c attached on the electric charge transferring layer 37b, and the other end of the dark current sensing resistor 49c is connected to the negative electrode of the power source 49a. Namely, the dark current sensing resistor 49c is provided in series between the electric charge transferring layer 37b and the power source 49a. The capacitor 49d is connected in parallel to the dark current sensing resistor 49c. The voltage detecting unit 49e detects a voltage generated in the dark current sensing circuit 49c, and is connected in parallel to the dark current sensing resistor 49c and the capacitor 49d. While the switch 49b is closed, an electric voltage is applied to the electrostatic information recording medium 31, the dark current sensing circuit 49c, and the capacitor 49d through the power source 49a. At this time, the voltage generated in the dark current sensing circuit 49c is detected by the voltage detecting unit 49e. Based on the voltage, the dark current flowing in the electrostatic information recording medium 31 is sensed, so that the resistant value of the electrostatic information recording medium 31 is obtained.

Figure 7:
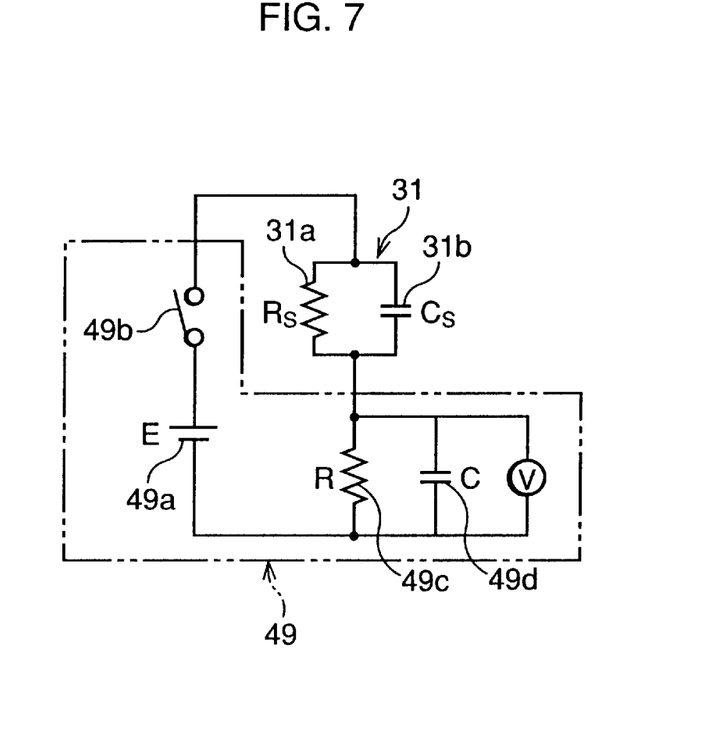
FIG. 7 is a diagram showing a circuit of the electro-developing recording medium and the dark current sensing circuit.
Figure 8:
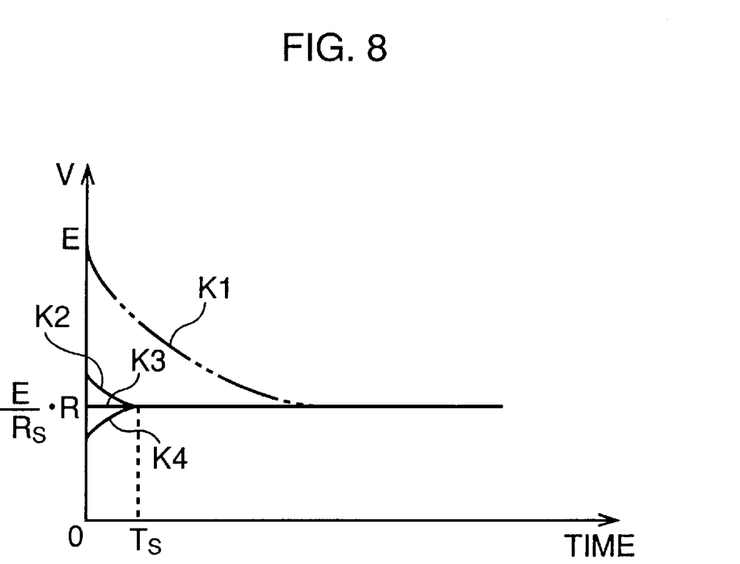
FIG. 8 is a graph showing a time change of an electric voltage generated in the dark current sensing resistor.

For sensing the steady voltage generated in the dark current sensing circuit 49c within a short time, the resistance of the dark current sensing circuit 49c and the capacity of the capacitor 49d are determined so that a voltage settling time when sensing the voltage can be swiftly reached. With reference to FIGS. 7 and 8, the determinations of the resistance and the capacity are described below. FIG. 7 shows an equivalent circuit of the electrostatic information recording medium 31 and the dark current sensing circuit 49, and the electrostatic information recording medium 31 being equivalent to a circuit in which a resistor 31a is connected to a capacitor 31b in parallel. FIG. 8 shows a time change of the voltage V generated in the portion between both ends of the dark current sensing resistor 49c.

Suppose that the capacitor 49d is not provided in the dark current sensing circuit 49. If the switch 49b is closed from the open state while light is shut out from the electrostatic information recording medium 31, i.e., the shutter 22 is closed, a step-shaped voltage is applied to the electrostatic information recording medium 31 and the dark current sensing circuit 49. Therefore, in the initial stage of the voltage application, the impedance of the capacitor 31b is small, and thus, a current flows mainly in the capacitor 31b. Therefore, there is little voltage drop in the electrostatic information recording medium 31, and thus, a voltage E having approximately the same value as that of the power source 49a is generated in the dark current sensing resistor 49c. Since the capacitor 31b is charged as time elapses, the electric current begins to flow in the resistor 31a, and the electric current value is lowered. Namely, the voltage generated in the dark current sensing resistor 49c is lowered (see the chain double-dashed line K1 in FIG. 8), and finally, a voltage divided by the resistors 31b and 49c is generated in the resistor 49c.

Conversely, if the capacitor 49d is provided in the dark current sensing circuit 49, immediately after the switch 49b is closed, since the voltage E of the power source 49a is divided by the capacitors 31b and 49d, the voltage V generated in the dark current sensing resistor 49c is $$V=(Cs/(Cs+C))\times E(t=0+) \quad (1)$$

wherein Cs is the electrostatic capacity of the capacitor 31b, and C is the electrostatic capacity of the capacitor 49d. When a significantly long time elapses after the switch 49b is closed, the voltage E is divided by the resistors 31a and 49c. Accordingly, the voltage V generated in the dark current sensing resistor 49c is $$V=(R/(Rs+R))\times E(t=\infty) \quad (2)$$

wherein Rs is the resistance value of the resistor 31b, and R is the resistance value of the resistor 49c.

For setting the time constant of voltage change of the dark current sensing resistor 49c to substantially 0, the voltage at time $t=0_+$ needs to be equal to the voltage at time $t=\infty$. Namely, by setting the formula (1) equal to the formula (2), the following can be said:

$$(Cs/(Cs+C))=(R/(Rs+R)) \therefore Cs\times Rs=C\times R \quad (3)$$

The right side of the formula (3) shows a first time constant which is determined in accordance with the dark current sensing resistor 49c and the capacitor 49d. The left side of the formula (3) is a second time constant of the electrostatic information recording medium 31.

Namely, when the capacitor 49d which makes the first and second time constants have the same values is connected to the dark current sensing resistor 49c in parallel, the time taken to settle the voltage of the dark current sensing resistor 49c after closing the switch 49b, i.e., the time by which the resistance of the electrostatic information recording medium 31 can be sensed, is minimized. Note that, in FIG. 8, references K2, K3, and K4 indicate the cases of $R\times C=Rs\times Cs-|\delta|$, $R\times C=Rs\times Cs$, and $R\times C=Rs\times Cs+|\delta|$, respectively. Namely, even if there is an error δ between R×C and Rs×Cs, the voltage generated in the dark current sensing resistor 49c becomes constant at time Ts.

Figure 9A:
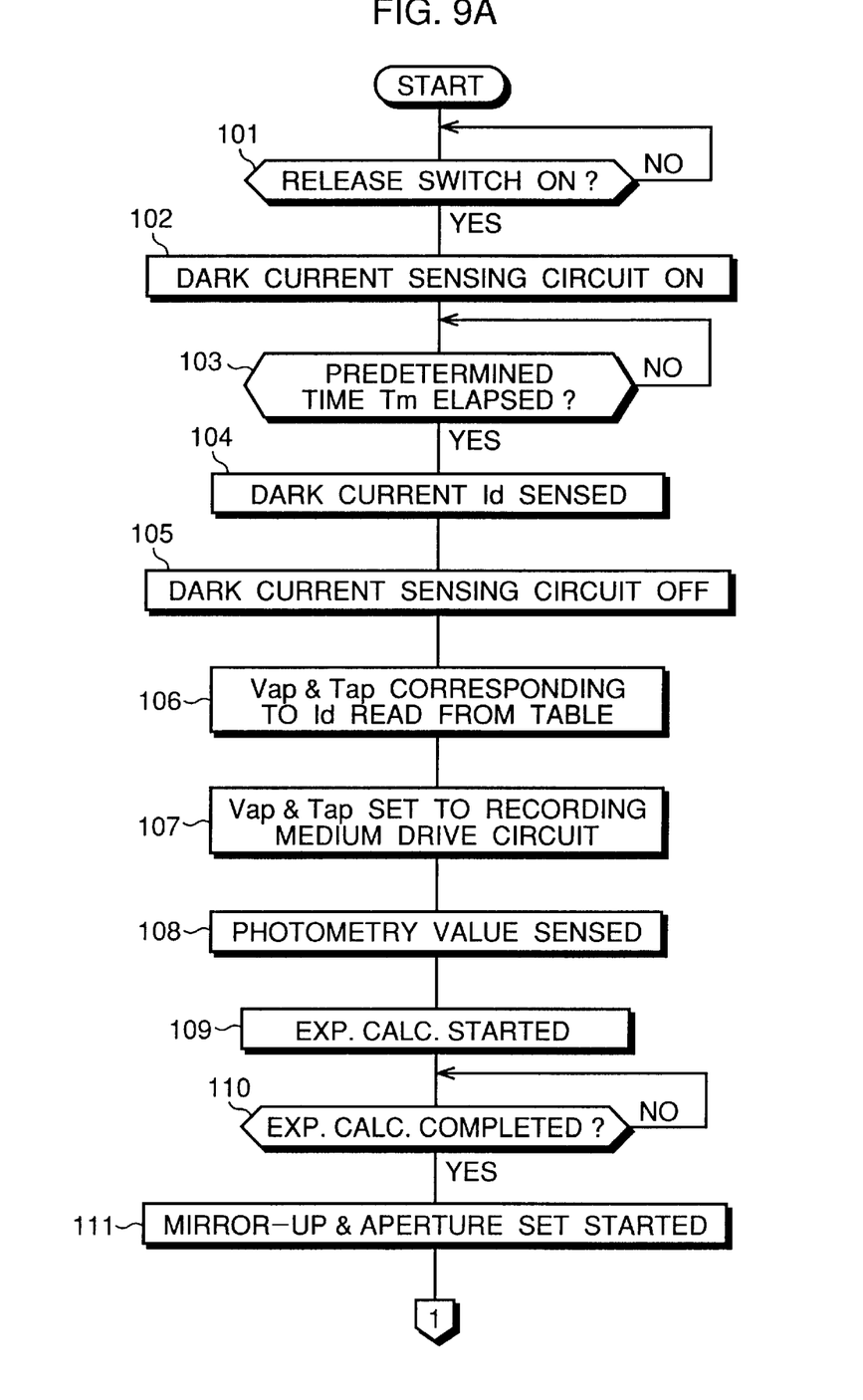
FIGS. 9A and 9B are flow charts of a program for performing a recording operation by which an image is recorded on the electro-developing recording medium.
Figure 9B:
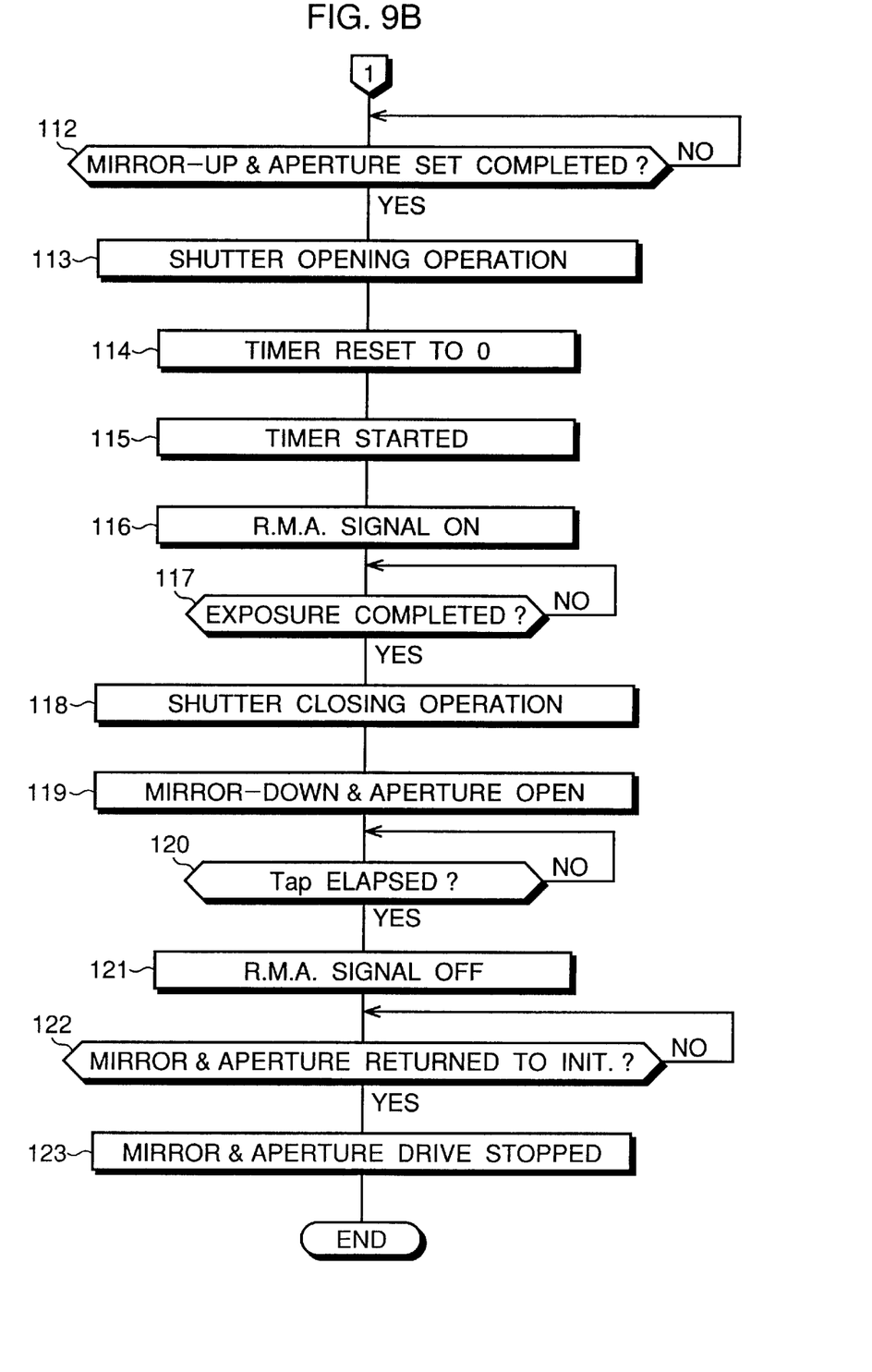

FIGS. 9A and 9B are flow charts of a recording operation (i.e., a photographing operation) in which an image is recorded on the electro-developing recording medium 30.

When it is sensed in Step 101 that the release switch 14 has been depressed, switch 49c of the dark current sensing circuit 49 is closed in Step 102, so that the dark current sensing circuit 49 is turned ON. In Step 103, it is determined whether a predetermined time Tm has elapsed since switch 49c has been closed. This predetermined time Tm is longer than the time constant Ts (see FIG. 8) of the dark current sensing circuit 49. After the predetermined time Tm has elapsed, the process goes to Step 104, in which the dark current value Id flowing in the electrostatic information recording medium 31 is sensed based on the voltage generated in the dark current sensing resistor 49c. In Step 105 switch 49b is opened so that the dark current sensing circuit 49 is turned OFF.

Figure 10:
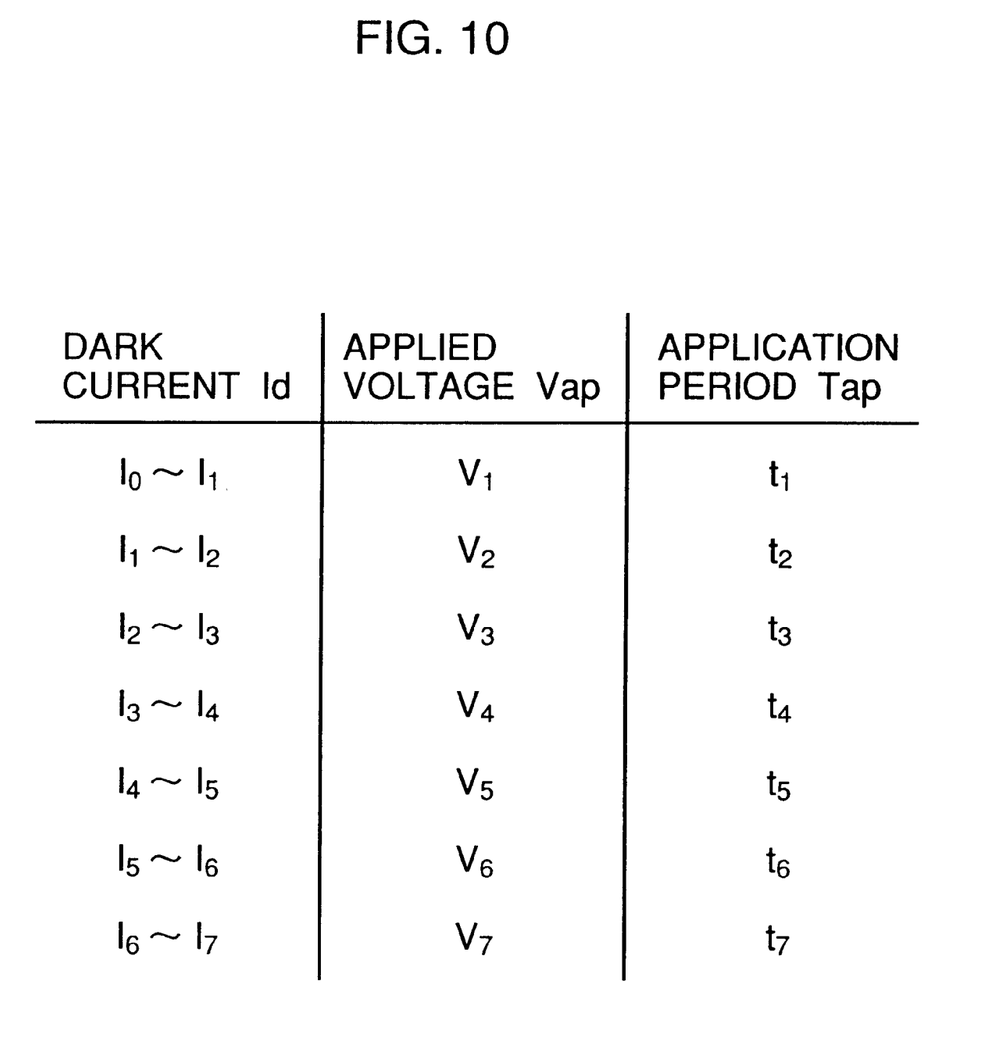
FIG. 10 is a diagram showing a relationship among a dark current, an applied voltage, and a voltage application period.

In Step 106, data of an optimum applied voltage Vap and an optimum application period Tap are read from a table stored in a memory included in the system control circuit 20, based on the dark current value Id. An example of the table is shown in FIG. 10, in which the applied voltage Vap and the application period Tap are set with regard to some range of the dark current values Id. The applied voltage Vap and application period Tap have values such that an image having the highest contrast can be obtained, and are set according to an experiment, for example. In Step 107, the applied voltage Vap and the application period Tap read in Step 106 are set to a memory included in the recording medium drive circuit 41.

In step 108, an output signal from the photometry sensor 28, i.e., a photometry value, is sensed. Then, in Step 109, an exposure calculation is initiated based on the photometry value. When the completion of the exposure calculation is confirmed in Step 110, the recording operation is performed in Step 111 and the remaining Steps in accordance with the calculation result.

In Step 111, the degree of opening of the aperture 12a is adjusted from the fully open state to a predetermined degree of opening, and the quick return mirror 21 is changed from the down position to the up position. Upon confirmation in Step 112 that the quick return mirror 21 has been changed to the up position and the adjustment of degree of opening the aperture 12a has been completed, the shutter 22 is opened in Step 113. Then, the value of the timer is reset to 0 in Step 114, and the timer is started in Step 115.

A recording medium activating signal is outputted in Step 116, so that the electric voltage Vap read in Step 106 is applied to the electro-developing recording medium 30. When the exposure time, obtained based on the exposure calculation, has elapsed and it is confirmed in Step 117 that the exposure has been completed, the shutter 22 is closed in Step 118. With the completion of the closing operation of the shutter 22, Step 119 is executed so that a rotation of the mirror 21 to the down position is started and a return to a fully open state of the aperture 12a is started. When it is confirmed in Step 120 that the application period Tap read in Step 106 has elapsed, the output of the recording medium activating signal is stopped in Step 121.

Thus, the recording medium activating signal is continuously outputted at least while the shutter 22 is open, and during this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 122 that the mirror 21 and the aperture 12a have returned to the initial conditions thereof, respectively, the operations of the mirror 21 and the aperture 12a are stopped in Step 123, and thus, this recording operation ends.

As described above, according to the embodiment, since the resistance of the electrostatic information recording medium 31 can be sensed approximately at the same time when the switch 49b of the dark current sensing circuit 49 is closed, the applied voltage and the application period, by which an image having a high contrast is obtained, can be quickly set. Therefore, a recording operation can be started immediately after the electro-developing recording medium 30 is set in the camera.

Note that the electro-developing recording medium 30 is not restricted to the constructions shown in FIGS. 3 through 5, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-60134 (filed on Feb. 22, 1996) and No. 8-209167 (filed on Jul. 19, 1996) which are expressly incorporated herein, by reference, in their entirety.

I claim:

1. A dark current sensing device provided in an electro-developing type camera using an electro-developing recording medium in which a visible image corresponding to an image formed on an electrostatic information recording medium is electronically developed by an electric charge storage medium, said electrostatic information recording medium having a first time constant in an electric voltage change thereof, said dark current sensing device comprising:

a dark current sensing resistor connected in series to said electrostatic information recording medium;

a capacitor connected in parallel to said dark current sensing resistor, a circuit comprising said dark current sensing resistor and said capacitor having a second time constant in an electric voltage change thereof; and an electric voltage sensing processor that senses an electric voltage generated in said dark current sensing resistor;

a resistance value of said dark current sensing resistor and a capacity of said capacitor being determined in such a manner that said second time constant is substantially equal to said first time constant.

2. A dark current sensing device according to claim 1, further comprising a power source that applies an electric voltage to each of said dark current sensing resistor and said capacitor, and a switch that turns ON and OFF said electric voltage application of said power source.

3. A dark current sensing device according to claim 1, further comprising a light beam shutting processor for that shuts a light beam entering said electrostatic information recording medium.

4. A dark current sensing device according to claim 1, wherein said electrostatic information recording medium is equivalent to a circuit having an equivalent resistor and an equivalent capacitor, a product of said resistance value of said dark current sensing resistor and said capacity of said capacitor being substantially equal to a product of a resistance value of said equivalent resistor and a capacity of said equivalent capacitor.

5. A recording operation control device provided in an electro-developing type camera using an electro-developing recording medium in which a visible image corresponding to an image formed on an electrostatic information recording medium is electronically developed by an electric charge storage medium, said electrostatic information recording medium having a first time constant in an electric voltage change thereof, said recording operation control device comprising:

a dark current sensing resistance device connected in series to said electrostatic information recording medium;

a capacitance device connected in parallel to said dark current sensing resistance device, a circuit comprising said dark current sensing resistance device and said capacitance device having a second time constant in an electric voltage change thereof;

an electric voltage sensing processor for sensing an electric voltage generated in said dark current sensing resistor device;

a dark current sensing processor that senses a dark current flowing in said electrostatic information recording medium, based on an electric voltage generated in said dark current sensing resistance device;

a voltage control processor that controls a value of an electric voltage applied to said electro-developing recording medium when said visible image is electronically developed by said electric charge storage medium; and a resistance value of said dark current sensing resistance device and a capacity of said capacitance device being determined in such a manner that said second time constant is substantially equal to said first time constant.

6. A recording operation control device according to claim 5, wherein said voltage control processor controls a time for which an electric voltage is applied to said electro-developing recording medium.

* * * * *